United States Patent [19]

Thaniyavarn

[11] Patent Number: 4,691,984

[45] Date of Patent: Sep. 8, 1987

[54] WAVELENGTH-INDEPENDENT POLARIZATION CONVERTER

[75] Inventor: Suwat Thaniyavarn, Pasadena, Calif.

[73] Assignee: TRW Inc., Redondo Beach, Calif.

[21] Appl. No.: 781,151

[22] Filed: Sep. 26, 1985

[51] Int. Cl.$^4$ ................................................ G02B 6/10
[52] U.S. Cl. ................................ 350/96.14; 350/96.13
[58] Field of Search ............... 350/96.12, 96.13, 96.14, 350/370, 374, 384; 455/612

[56] References Cited

U.S. PATENT DOCUMENTS 4,291,939  9/1981  Giallorenzi et al. ............. 350/96.14
4,533,207  8/1985  Alferness ........................ 350/96.14

Primary Examiner—Eugene R. LaRoche
Assistant Examiner—Steven J. Mottola
Attorney, Agent, or Firm—Noel F. Heal

[57] ABSTRACT

An electrooptical polarization mode converter that operates independently of the wavelength of the light being converted. The converter includes a titanium in-diffused waveguide formed in a lithium niobate substrate, but light is propagated in the direction of the optic axis, rather than perpendicular to it as in prior devices. Both transverse-electric (TE) and transverse magnetic (TM) modes experience the same material refractive index, and mode switching can be effected with only minimal phase velocity mismatch, by applying a bias voltage across the waveguide. The phase velocity mismatch is corrected electrooptically by applying an orthogonal electric field to the waveguide, and mode switching and phase velocity correction effects can be controlled independently. The resulting device is not only wavelength independent, but is insensitive to temperature changes, immune to optical damage due to the photorefractive effect and immune to problems often caused by out-diffusion of lithium oxide from lithium niobate.

14 Claims, 10 Drawing Figures ($V_2 = 0$)

($V_2 = 35.4V$)

WAVELENGTH-INDEPENDENT POLARIZATION CONVERTER

BACKGROUND OF THE INVENTION

This invention relates generally to devices employing the electrooptic effect and, more particularly, to electrooptical devices for converting the polarization mode of light between the transverse-electric (TE) mode and the transverse-magnetic (TM) mode. The electrooptic effect is a phenomenon in which the application of an electric field results in a change in the refractive index of a waveguide material, and the change in refractive index in turn produces a desired optical effect, such as a change in the polarization mode of light propagating along the waveguide. Electrooptical polarization converters have a wide range of applications in communications systems using optical fibers. The same structure can also be used as a switch or as an optical modulator.

One of the most commonly used materials for devices employing the electrooptic effect is lithium niobate ($LiNbO_3$). Waveguides are typically formed in lithium niobate by in-diffusion of titanium along a desired waveguide path. This structural combination has good electrooptical properties and is relatively simple to fabricate. However, it also has some serious disadvantages, especially in the context of a polarization mode converter.

Prior work in the area of electrooptic-effect polarization converters is typified by papers by Rod C. Alferness, including "Guided-Wave Devices for Optical Communication," IEEE J. Quant. Elect., VOL. QE-17, No. 6, June, 1981, pp. 946-59; "Electrooptic Guided-Wave Device for General Polarization Transformations," IEEE J. Quant. Elect., VOL. QE-17, No. 6, June, 1981, pp. 965-69; and "Waveguide Electrooptic Modulators," IEEE Trans. on Microwave Theory and Techniques, VOL. MTT-30, No. 8, Aug. 1982, p. 1121. In all of this prior work, the waveguide propagation direction is chosen to be transverse to the optical axis of the lithium niobate crystal, to take advantage of a relatively high coupling coefficient that this provides. As is well known, the electrooptic effect may be defined mathematically by an electrooptic tensor that relates the electric fields in three dimensions to the corresponding induced changes in refractive index. Selection of a propagation direction perpendicular to the optical axis results in electrooptically induced coupling between the TE and TM modes via one of the "off-diagonal" coupling coefficients of the tensor, namely the $r_{51}$ coefficient. Although this provides a numerically large coupling coefficient, there are a number of disadvantages inherent in the choice.

First, the material refractive indices "seen" by the two polarization modes are significantly different, regardless of the electrooptic effect. One mode will experience the x-axis or y-axis index, known as the ordinary index $n_o$, and the other mode will experience the z-axis index, known as the extraordinary index $n_e$. For efficient coupling between the two modes, there needs to be phase matching between the modes, but when the modes see significantly different refractive indices, a large mismatch in the phase velocities results. In the prior approaches to this problem, periodic electrode structures were needed to satisfy the phase matching conditions. This gave rise to one of the most important disadvantages of the prior approaches. Because of the presence of the electrode structures, the devices behaved as wavelength filters, in which the bandwidth depended on both the period and length of the electrodes. A typical bandwidth of approximately 15 Å has been reported by Alferness, for a device with a 6 mm. long electrode operating at a wavelength of 0.6 micron.

Another difficulty relating to the prior devices is that the difference in refractive indices seen by the two modes is highly temperature sensitive. Therefore, even if the resultant phase mismatch can be compensated by appropriate electrode structures, this solution will be effective only over a narrow temperature range.

Even more important considerations arise from two major problems that arise from the use of lithium niobate in electrooptical devices. One problem relates to optical damage due to the photorefractive effect, and the other relates to out-diffusion of lithium oxide. In the photorefractive effect, an impurity, such as a ferrous ion ($Fe^{2+}$), in the waveguide will absorb a photon of light and thereby generate free charge carriers in the form of an electron-hole pair. The charge carriers will move along the optical axis of the material, which is perpendicular to the waveguide propagation direction, under an internal electric field along this axis of the crystal. These mobile charge carriers accumulate on opposite sides of the waveguide, or on the top and bottom regions of the waveguide, depending on the orientation of the optical axis. The resulting electric field induces an unwanted refractive index change through the electrooptic effect. As the optical power transmitted through the device is increased, the photorefractive effect also increases. In practice, the photorefractive effect imposes an upper power limit on the operation of the waveguide, beyond which the waveguide tends to operate less effectively, or may suffer long-term optical damage. Inherently, the effect also limits operation to longer wavelengths, since shorter wavelengths have higher energies and increase the likelihood of optical damage.

The other important disadvantage of lithium niobate is that there tends to be an out-diffusion of lithium oxide ($Li_2O$) during the process of in-diffusion of titanium. This results in the formation of an upper layer on the lithium niobate that no longer has the required refractive index properties. This layer tends to scatter light horizontally out from the waveguide, in the z-axis direction, which is perpendicular to the waveguide. This effect is more pronounced when longer diffusion times are used, to ensure a deep diffusion of the titanium. Unfortunately, however, a deep diffusion is typically required to ensure good coupling between the waveguide and optical fibers used in conjunction with the device. Design of a waveguide addressing this problem involves a trade-off between selecting a deep diffusion to minimize coupling losses with fibers, and selecting a shallow diffusion to minimize losses in the waveguide itself due to out-diffusion of lithium oxide. Prior to the present invention, there appears to be no good compromise.

It will be appreciated from the foregoing that there is still a need for innovation in the design of electrooptical devices such as mode converters. In particular, there is a need for a polarization mode converter that is wavelength independent, and is immune to the problems of optical damage temperature sensitivity, and out-diffusion of lithium oxide. The present invention provides the desired solution to these problems.

SUMMARY OF THE INVENTION

The present invention resides in a wavelength-independent electrooptical polarization mode converter having none of the problems associated with prior approaches to the same problem. Briefly, and in general terms, the mode converter of the invention comprises an electrooptical substrate cut along a direction perpendicular to its optical axis, an optical waveguide formed by diffusion of material into the substrate, the waveguide being oriented to provide a propagation direction parallel with the optical axis of the substrate, and electrode means disposed on the substrate and positioned with respect to the waveguide to provide control of a coupling coefficient for conversion between one polarization mode and another, and control of the relative phase between the two modes. In this structure, both modes experience the same material refractive index, and any phase mismatch between the modes can be corrected with the electrode means.

More specifically, the device of the invention is a mode converter formed on an x-cut, z-propagating crystal substrate of lithium niobate, and the waveguide is of in-diffused titanium. Since the waveguide is aligned with the optical (z) axis of the crystal, the transverse-electric (TE) and transverse-magnetic (TM) modes experience the same material refractive index, and very little phase mismatch results between the two modes. Any phase mismatch that does occur can be easily corrected electrooptically by appropriately positioning and biasing the electrode means.

Ideally, the electrode means includes a common ground electrode disposed on one side of the waveguide, a first electrode disposed over the wave guide to effect mode conversion by application of an electric field predominantly in the x-axis direction, and a second electrode disposed on the other side of the waveguide to effect phase correction by application of an electric field predominantly in the y-axis direction. Alternatively, a single pair of electrodes may be used, but with less convenient independent control of the fields in the x and y axes. Since the electrode structure is not wavelength sensitive, the device operates over a broad band of wavelengths, and may be used with broadband light sources, such as superluminescent diodes.

In accordance with another aspect of the invention, the device can be used to provide an output with a selected and electrically tunable polarization angle. Application of an electric field predominantly in the y-axis direction is first used to provide near perfect phase velocity matching of the TE and TM modes. Then the electric field predominantly in the x-axis direction can be tuned to provide an output that is still linearly polarized but with a selected polarization angle.

This principle can be used to great advantage in modulating a light signal for use in a communication link. Basically, an electrical communication signal is used to modulate the polarization angle of an input light source. The modulator is biased to its point of maximum linearity, which is with half of the power in one polarization mode and the other half in the orthogonal mode. With this bias, modulation by the electrical signal produces output polarization components that are the complement of each other. At a receiving location, the modulated light signal is separated into polarization components. The sum and difference of the polarization components are processed by an analog divider, to produce the original electrical signal again. The communication link has a relatively high signal-to-noise ratio and is practically insensitive to fluctuations in the power of the light source.

Since propagation is in the z-axis direction, the photorefractive effect is greatly minimized and higher powers and lower wavelengths can be used. Propagation in the z-axis direction also eliminates the problems otherwise arising from the out-diffusion of lithium oxide. Therefore, deeper titanium diffusions can be employed, to minimize losses due to coupling with optical fibers.

It will be appreciated from the foregoing that the invention provides an almost perfect solution to the problems that have plagued prior devices intended for the same purpose. In particular, the converter of the invention operates independently of wavelength, and is immune to the effects of optical damage due to the photorefractive effect, out-diffusion of lithium oxide, and temperature instability. It also provides a conversion efficiency exceeding 99.95%, and an extinction ratio in excess of 33dB (decibels). Extinction ratio is a measure of the degree to which one polarization mode is extinguished in favor of the other in the mode conversion process. Other aspects and advantages of the invention will become apparent from the following more detailed description, taken in conjunction with the accompanying drawings.

DESCRIPTION OF THE PREFERRED EMBODIMENTS

Figure 1:
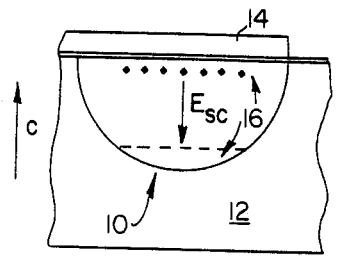
FIG. 1 is a cross-sectional view of a waveguide of the prior art, illustrating the photo-refractive effect of an optically induced space-charge field.

As shown in the drawings for purposes of illustration, the present invention is concerned with polarization mode conversion devices employing the electrooptical effect. As outlined above, in the past such devices have been highly wavelength sensitive and have suffered from other significant disadvantages.

By way of further background, the electrooptic effect is defined mathematically in terms of a tensor relation;

$$\Delta_i = \Delta\left(\frac{1}{n^2}\right) \quad i = \sum_{j=1}^{3} r_{ij} \cdot E_j \tag{1}$$

For lithium niobate, this can be expanded as follows:

$$\begin{bmatrix} \Delta_1 \\ \Delta_2 \\ \Delta_3 \\ \Delta_4 \\ \Delta_5 \\ \Delta_6 \end{bmatrix} \begin{matrix} xx \\ yy \\ zz \\ yz \\ zx \\ xy \end{matrix} = \begin{bmatrix} \bullet & r_{12} & r_{13} \\ \bullet & r_{22} & r_{23} \\ \bullet & \bullet & r_{33} \\ \bullet & r_{42} & \bullet \\ r_{51} & \bullet & \bullet \\ r_{61} & \bullet & \bullet \end{bmatrix} \begin{bmatrix} E_x \\ E_y \\ E_z \end{bmatrix} \tag{2}$$

The symbol n is either the ordinary index $n_o$ or the extraordinary refractive index $n_e$. In the tensor, some of the coefficients are indentical:

$$r_{12} = r_{61} = -r_{22},$$

$$r_{23} = r_{13},$$

and $$r_{42} = r_{51}.$$

The so-called diagonal elements of the coefficient matrix, in the top three rows, result in an index change, and therefore a phase change for an incident optical field polarized along the appropriate crystallographic axis. For example, for an applied electric field along the z axis, the electrooptically induced index change for light polarized along the z direction, which sees the extraordinary index, would be:

$$\Delta n_e = -\frac{n_e^3}{2} r_{33} E_z \tag{3}$$

The remaining elements of the matrix, the off-diagonal elements in the lower three rows, represent electrooptically induced conversion or mixing between orthogonally related polarization components. For example, an $E_x$ electric field mixes the x and z optical polarization components through the $r_{51}$ coefficient. Utilization of the off-diagonal coefficients is needed to effect waveguide polarization modulation or switching.

The optical polarization state can be defined in various ways, but for convenience it will be defined here in terms of a polarization angle and a phase angle. The polarization angle specifies the relative amplitudes of the transverse-electric (TE) polarization mode component and the transverse-magnetic (TM) polarization mode component. The phase angle is the phase difference between the two components. For example, for a phase angle of zero, a polarization angle of zero represents purely TE polarized light, and a polarization angle of $\pi/2$ represents purely TM polarized light. A polarization converter effects, as nearly as possible, a change from pure TE mode to pure TM mode, or vice versa, with no change in phase angle. As will be discussed later, a more generalized polarization transformer should be capable of effecting a transformation from any input polarization angle and phase angle to any other desired polarization angle and phase angle. The principal goal of this invention is to provide an effective polarization converter, but it will be appreciated that achievement of this goal also provides an important element of a generalized polarization transformer.

In the past, polarization converters have utilized the $r_{51}$ coefficient to effect conversion. The choice appears to have been made principally because the $r_{51}$ coefficient is about eight times larger than the $r_{61}$ coefficient, which is the only other off-diagonal coefficient. Selection of the $r_{51}$ coefficient is made by choosing the x or y direction as the waveguide propagation direction, so that the TE and TM modes use the z and x or the z and y axes, which will result in use of the numerically equal $r_{51}$ or the $r_{42}$ coefficients. Although this choice results in a large coupling coefficient for use in the mode conversion, it also gives rise to the problems alluded to in the background section of this specification. Before the invention is discussed in detail, it is important to understand how these problems affect operation of a polarization mode converter.

First, because the propagation direction used in the prior devices is perpendicular to the optical axis, the TE and TM modes "see" different refractive indices. One mode sees the ordinary index while the other mode sees the extraordinary index. The difference in these two indices is so great that a large phase mismatch is generated between the TE and TM mode components. The phase difference is so large that it cannot be corrected by use of the electrooptical effect alone, and periodic electrode structures are needed to effect phase matching. However, because these structures are wavelength dependent, the entire device suffers from this deficiency, and is responsive only over a very narrow bandwidth.

Another important problem relates to the photorefractive effect, in which exposure of a waveguide to visible radiation can result in optical damage to the waveguide. FIG. 1 shows a waveguide, indicated by reference numeral 10, made from titanium diffused into a lithium niobate substrate 12. A metal electrode 14 is deposited on the structure above the waveguide 10. Incident photons are absorbed by impurities in the waveguide, such as ferrous ions ($Fe^{2+}$), and the resulting electron-hole charge carriers will drift in opposite directions along the optical axis of the waveguide, as indicated at 16. In the waveguides of the prior art, the optical or z axis of lithium niobate is perpendicular to the direction of light propagation along the waveguide 10, and the oppositely charged carriers accumulate either at the top and bottom of the waveguide, as shown in the figure, or on opposite sides of the waveguide. In either case, an electric field is set up and the refractive index of the waveguide is distorted as a result of the electrooptic effect. The photorefractive effect results in both short-term and long-term damage to the waveguide, and is a well recognized problem associated with lithium niobate waveguide structures.

Figure 2:
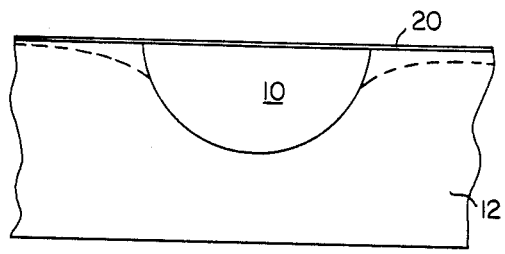
FIG. 2 is a cross-sectional view of a waveguide of the prior art, illustrating the effect of out-diffusion of lithium oxide.

A third major problem with lithium niobate and titanium waveguides of the prior art relates to the out-diffusion of lithium oxide during the in-diffusion of the titanium waveguide. The effect is shown diagrammatically in FIG. 2, which shows an upper layer 20 in the lithium niobate substrate, caused by the out-diffusion. The layer 20 does not have the desired refractive index to act as an effective cladding material for the waveguide, and light in the waveguide is scattered in both directions along the optical axis, which, in the prior devices is perpendicular to the propagation direction.

Figure 3:
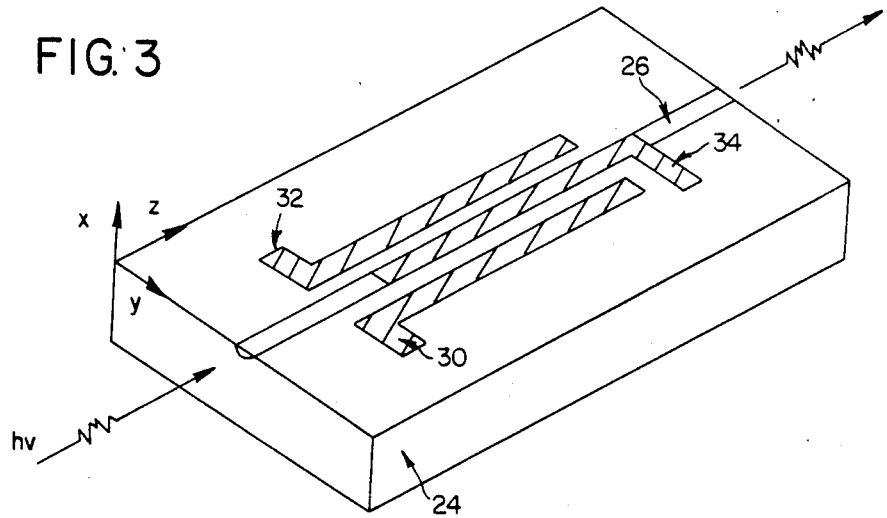
FIG. 3 is a perspective view of a converter in accordance with the present invention.

In accordance with the invention, polarization conversion is effected in a device fabricated on a lithium niobate substrate 24 in which the propagation direction is along the optical or z axis. Specifically, the substrate 24 is an x-cut, z-propagating lithium niobate crystal, and it has a titanium waveguide 26 diffused into its surface and aligned with the z-axis direction. This aligns the TM mode vector in the x axis and the TE mode vector in the y axis, as indicated in FIG. 3. The first important result of this arrangement is that the TE and TM modes see the same refractive index, the ordinary index $n_o$. Choice of these axes also results in the utilization of the $r_{61}$ off-diagonal coefficient for coupling between the TE and TM modes. Although this coefficient is much smaller than the $r_{51}$ coefficient, many advantages follow from the choice of $r_{61}$.

Polarization coupling is provided by an electrooptically induced index change given by:

$$[\Delta n]_{TE \rightarrow TM} = -n_o^3/2 \cdot r_{61} \cdot E_x \quad (4)$$
$$= -n_o^3/2 \cdot r_{22} \cdot E_x$$

Changes in phase velocity (or propagation constants) are produced by electrooptically induced index changes given by:

$$[\Delta n]_{TM} = -n_o^3/2 \cdot r_{12} \cdot E_y \quad (5)$$
$$= +n_o^3/2 \cdot r_{22} \cdot E_y$$
$$[\Delta n]_{TE} = -n_o^3/2 \cdot r_{22} \cdot E_y \quad (6)$$

From these relationships, it can be seen that the degree of coupling between the TE and TM modes can be varied by changing an electric field $E_x$ in the x direction, and that this change has no effect on the phase velocity. Similarly, the phase velocity can be varied by changing an electric field $E_y$ in the y direction, without affecting the degree of TE/TM coupling.

Because the waveguide propagation direction is along the optical axis, both the TE and TM modes see the same ordinary index $n_o$, and are therefore nearly phase matched. The only contribution to a phase mismatch is derived from a modal birefringence effect due to different waveguide boundary conditions seen by the two modes. In particular, the effective mode indices $N_{TE}$ and $N_{TM}$ can be expressed as:

$$N_{TE} = n_o + \Delta n_{TE}^{BC} + \Delta n_{TE}^{EO} \quad (7)$$
$$N_{TM} = n_o + \Delta n_{TM}^{BC} + \Delta n_{TM}^{EO}$$

The superscript BC indicates for "boundary condition" and the superscript EO means "electrooptically induced." For the TM mode, the waveguide is bounded by lithium niobate on the bottom and by air or electrode metal on the top. For the TE mode, however, the waveguide is bounded by lithium niobate on both sides. Therefore, the two middle or BC terms are not the same for the two modes, but the relatively small difference can be easily compensated by adjustment in the electrooptically induced component given by the third term of equation (7).

It will be observed that equations (5) and (6) provide index effects of equal magnitudes but opposite signs. Therefore, the effective mode indices $N_{TE}$ and $N_{TM}$ and the corresponding phase angles can be matched by applying an appropriate electric field $E_y$. Since this arrangement requires no periodic electrode structure, the mode conversion efficiency of the device is not sensitive to wavelength.

Another advantage of the device of the invention is that, unlike prior devices, it is not sensitive to temperature. This is because ($N_{TE} - N_{TM}$) is independent of the ordinary index $n_o$, and both the modal birefringent component $\Delta n^{BC}$ and electroptically induced component $\Delta n^{BC}$ are relatively temperature insensitive. The $r_{22}$ coefficient, unlike other coefficients for lithium niobate, is practically temperature independent.

In the device of the invention, the photorefractive effect produces charges separated by the length of the waveguide, rather than its width or depth. The charge separation is therefore in the order of 1-2 cm, compared to 3-5 microns in prior devices. The magnitude of the optical damage problem caused by the photorefractive effect is, therefore, several orders of magnitude smaller in the z-propagation waveguide.

The problems arising from out-diffusion of lithium oxide are also avoided in the device of the invention. This is because the optical scattering that occurs as a result of the out-diffusion is in the direction of the extraordinary index, i.e. in the z-axis direction. Since propagation in the new device is in the z direction, scattering in this direction does not affect the width of the waveguide. Accordingly, in-diffusion of titanium can take place over any desirably long period, to ensure deep diffusion of the waveguide material, and to minimize losses due to coupling the waveguide to optical fibers.

Figure 4B:
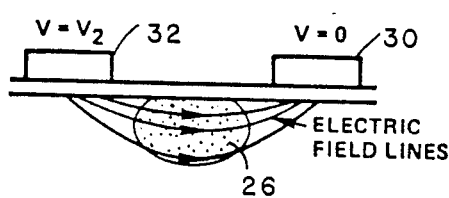
FIGS. 4a and 4b are fragmentary cross-sectional views taken substantially along the line 4—4 in FIG. 3, and showing the direction of the electric fields established by the electrodes of the device of FIG. 3.

From the foregoing description, it will be understood that the only additional structure needed for the converter of the invention is to provide the necessary $E_x$ and $E_y$ electric fields to control mode conversion and phase correction. In the preferred embodiment of FIG. 3, this structure includes a grounded electrode 30 parallel with the waveguide 26 and displaced laterally from it, a phase tuning electrode 32 parallel with the waveguide and displaced to the other side of it, and a conversion control electrode 34 positioned right over the waveguide. The simplified cross-sectional views of FIGS. 4a and 4b illustrate how these electrodes operate to generate the appropriate electric fields in the device.

Figure 4A:
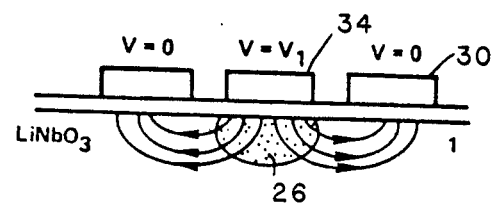

As shown in FIG. 4a, application of a bias voltage $V_1$ between the converter control electrode 34 and the grounded electrode 30 results in a predominantly vertical (x-axis) electric field through the waveguide 26. The application of a bias voltage $V_2$ between the phase tuning electrode 32 and the grounded electrode 30 results in a predominantly horizontal (y-axis) electric field through the waveguide 26. There will, of course, be some interaction between the separate electrodes, and each does not produce a purely horizontal or vertical component. However, for practical purposes, the two electrodes 32 and 34 provide relatively independent control of the $E_x$ and $E_y$ field, and therefore of the polarization mode coupling coefficient and the phase velocity (or propagation constants).

An important aspect of the independent control of polarization mode coupling coefficient and phase velocity is that the device can be used to provide an electrically tunable degree of linear polarization rotation. If the $V_2$ voltage used for phase tuning is adjusted to near perfect phase velocity matching for the two polarization tuning for the TE and TM polarization states, subsequent adjustment of the other voltage $V_1$ can be used to control the polarization angle of the light output from the device. For example, if the input light is purely in the TE mode, increasing $V_1$ will vary the polarization angle continuously from zero to ninety degrees, corresponding to the TM mode, and beyond.

Figure 5A:
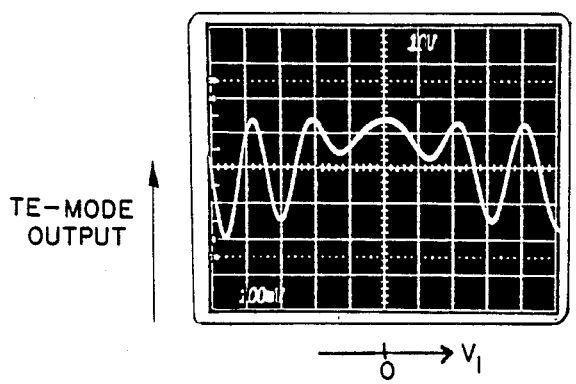
FIG. 5a and 5b are graphs showing the mode conversion performance of the device of FIG. 3.
Figure 5B:
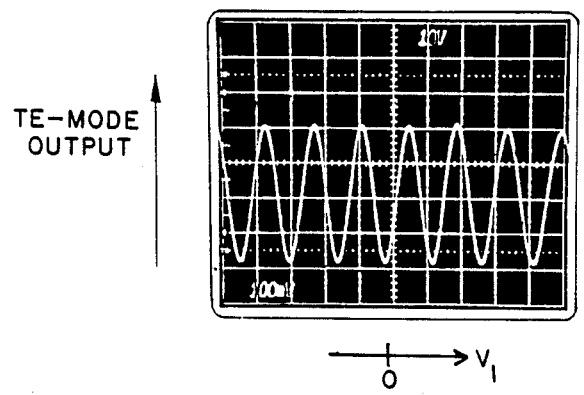

FIGS. 5a and 5b are graphs showing the performance of the device of FIG. 3. The vertical axis represents TE-mode output, so that a low position on the plotted curve represents predominantly TM-mode output. The horizontal axis in each case represents the $V_1$ conversion control voltage, with a zero bias being in the center of the figure. FIG. 5a was recorded using a $V_2$ bias of zero volts, and FIG. 5b was recorded using a $V_2$ bias of 35.4 volts.

It will be observed from FIG. 5a that, with a zero $V_2$ bias, meaning that no phase correction field is applied, the conversion to TM mode is never properly completed, because of the the unmatched phase velocities arising from birefringence. In FIG. 5b, however, with an applied phase matching bias of 35.4 volts, there is virtually complete mode conversion with a $V_1$ bias of less than eight volts. The conversion efficiency was measured at 99.95% in this embodiment of the invention, corresponding to an extinction ration of greater than 33 dB.

In the illustrative embodiment shown in FIG. 3, the waveguide 26 was formed from a strip of titanium three microns wide and 400 Å thick, diffused into the lithium niobate substrate 24 for six hours at 1020° C. in the presence of flowing argon gas. A silicon dioxide ($SiO_2$) film (not shown) of approximately 1400 Å thickness was deposited over the waveguide using electron-beam evaporation. This provides the necessary buffer layer to eliminate TM-mode propagation loss caused by the metallic electrode loading. The electrodes were are of 200 Å thickness and were formed by thermal evaporation onto an area defined by conventional photolithographic techniques. The electrodes 30, 32, and 34 are each approximately 3.5 microns wide, and the gaps between the electrodes are approximately the same distance. The electrode lengths are approximately one centimeter.

Figure 6:
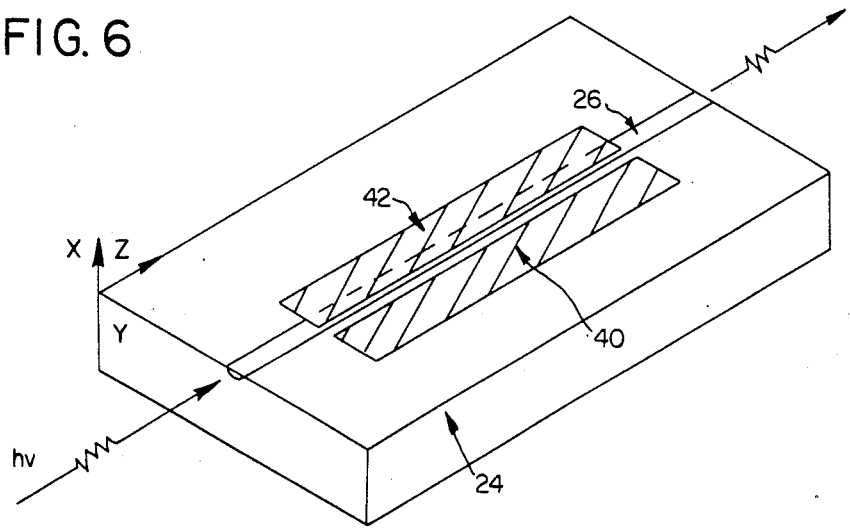
FIG. 6 is a perspective view of an alternative embodiment of the invention, using only two electrodes instead of three.

FIG. 6 shows a device with an alternative electrode arrangement, including a wider grounded electrode 40 and a second electrode 42 disposed in partial overlapping relationship with the waveguide 26. With only a single bias boltage applied across these electrodes, it is more difficult to control the magnitudes of the $E_x$ and $E_y$ fields independently. To achieve the appropriate values of $E_x$ and $E_y$ to effect mode switching and phase correction requires careful positioning of the center electrode 42 during fabrication. The theory of operation is otherwise the same as for the embodiment of FIG. 3.

Figure 7:
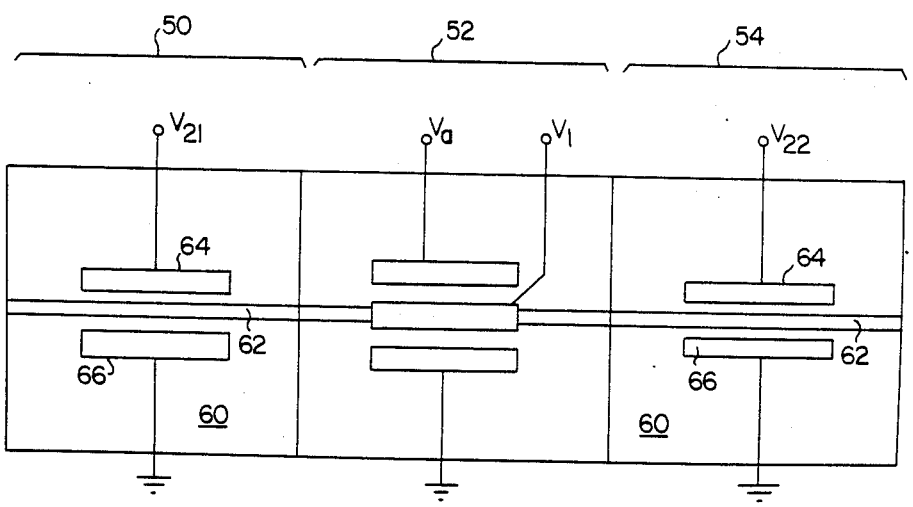
FIG. 7 is simplified plan view of a generalized polarization transformer including the polarization converter of the invention.

As mentioned earlier, a generalized polarization transformer should be capable of effecting a transformation from any input polarization angle and phase angle to any other desired polarization angle and phase angle. To achieve this generality requires an input TE/TM phase shifter, indicated at 50 in FIG. 7, a phase-matched TE-TM converter with variable coupling, indicated at 52, and an output TE/TM phase shifter 54. The theory relating to the reasons for this configuration are described in detail in the paper by Ro.. C. Alferness entitled "Electooptic Guided-Wave Device for General Polarization Transformations," IEEE J. Quantum Elect., Vol. QE-17, No. 6, pp. 965–69, June 1981. The TE-TM converter described in the paper was, of course one of those known in the art, and having the disadvantages discussed above. In accordance with one aspect of the present invention, a generalized polarization transformer is configured using the TE-TM converter of the invention, to provide a device that is insensitive to wavelength and temperature changes, and is not susceptible to the problems that are usually associated with titanium and lithium niobate electrooptical devices. The phase shifters 50 and 54 each include electrooptical substrate 60, a waveguide 62, and two electrodes 64 and 66 disposed in a parallel relationship on each side of the waveguide. The phase shifters 50 and 54 use and $E_y$ electric field to effect a desired phase shift without affecting the polarization mode.

As described above, the device of the invention can be used as a polarization mode converter that is insensitive to wavelength. Another important application of the invention is as a polarization angle modulator. If the $V_2$ control voltage is adjusted to provide near perfect phase velocity matching for the two polarization modes, TE and TM, the other control voltage $V_1$ can then be employed to tune the polarization angle to any desired value. More importantly, the device can be operated as a polarization angle modulator with desirable characteristics.

Figure 8:
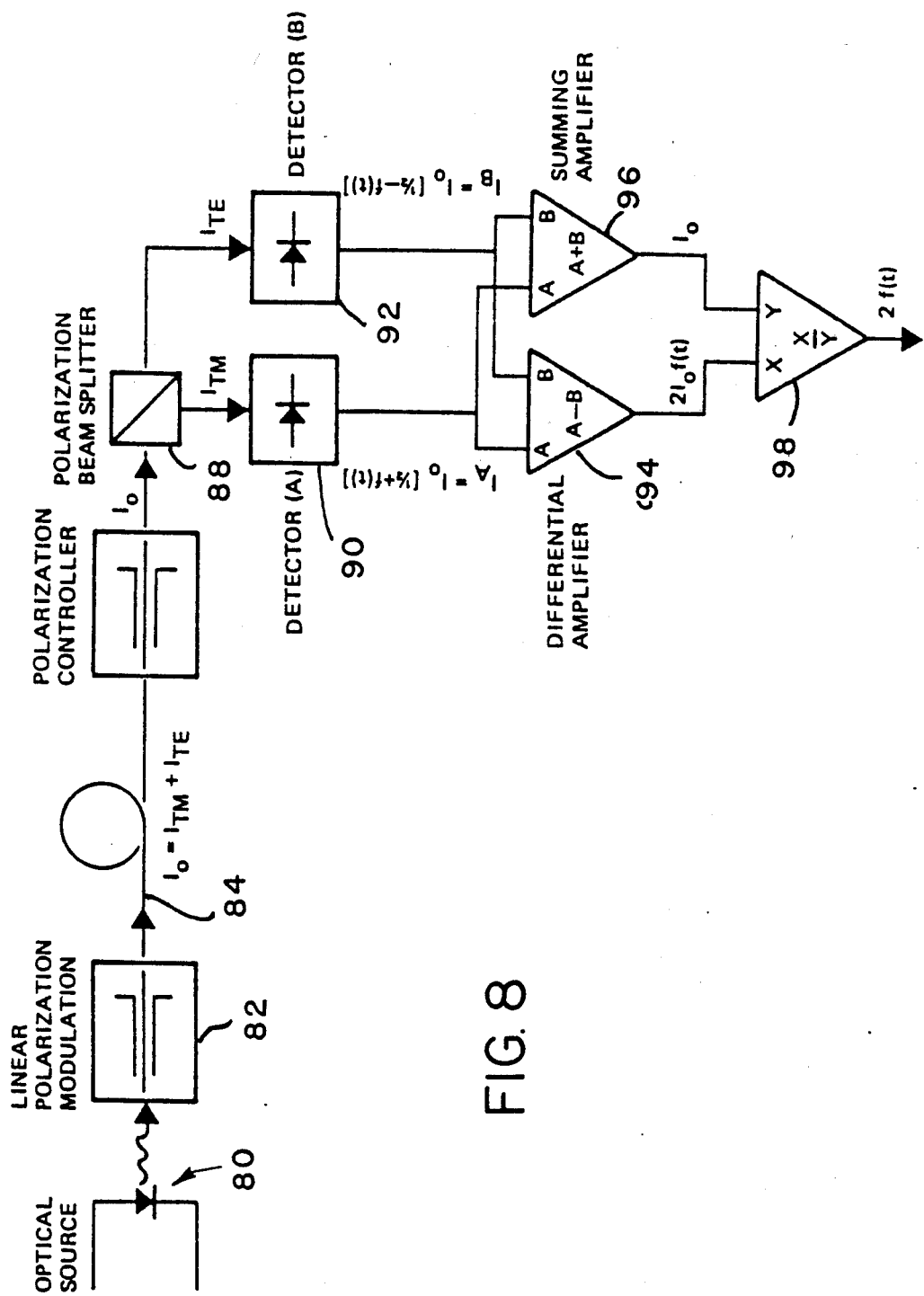
FIG. 8 is a schematic diagram of an optical communication link using the polarization technique of the invention.

FIG. 8 shows how such a modulator can be incorporated into an optical communication link. The transmitting portion of the link includes an optical source 80 and a linear polarization modulator 82 operating as described above. The modulator 80 is biased to its point of maximum linearity, which that half of the input power is converted to one polarization mode and the other half is in the other mode. When an electrical signal is applied to the modulator, the output polarization components will be the complement of each other an will be transmitted through the communication link, as indicated by line 84.

The receiving end of the link includes a polarization beam splitter 88, two detectors 90 and 92, a differential amplifier 94, a summing amplifier 96, and an anlog divider 98. The received modulated signal is passes into the polarization beam splitter, which produces TE and TM mode output components for introduction to the detectors 90 and 92. The outputs from the detectors are proportional to $I_A$ and $I_B$, where:

$$I_A = I_o(\tfrac{1}{2} + f(t))$$

$$I_B = I_o - I_A = I_o(\tfrac{1}{2} - f(t))$$

$I_o$ *is the output intensity of the optical source, and f(t) is a time-varying electrical modulating signal.*

These two signals are applied to the differential amplifier 94 to produce a difference signal:

$$I_A - I_B = 2I_o f(t).$$

The same two signals are applied to the summing amplifier 96, to produce a sum output:

$$I_A + I_B = I_o.$$

When the difference signal is divided by the sum signal in the analog divider 98, the result is 2f(t), which is independent of the input optical intensity $I_o$. This technique eliminates any noise due to random fluctuation of the optical source power, and provides a modulator with a relatively high signal-to-noise ratio.

It will be appreciated from the foregoing that the present invention represents a significant advance in the field of electrooptical devices used for polarization mode conversion. The converter of the invention is of simple structure having low propagation losses and crosstalk, but is the first lithium niobate polarization converter that is wavelength independent. Moreover, the device is immune to optical damage caused by the photorefractive effect and is immune to scattering effects caused by lithium oxide out-diffusion. The device is electrically tunable to provide an adjustable degree of linear polarization rotation and a high conversion efficiency of greater than 99.95%, corresponding to an extinction ratio of about 33 dB. It operates at high speed and with a low polarization conversion voltage of less than 8 volts for complete conversion in a one-centimeter waveguide.

It will also be appreciated that, although specific embodiments of the invention have been described in detail for purposes of illustration, various modifications may be made without departing from the spirit and scope of the invention. Accordingly, the invention is not to be limited except as by the appended claims.

I claim:

1. A wavelength-independent electrooptical polarization mode converter, comprising:

an electrooptical crystal substrate cut in a plane defined by a direction perpendicular to the optical axis of the crystal;

an optical waveguide formed by diffusion of material into a surface of the substrate, the waveguide being oriented to provide for the propagation of light from one end to the other, in a direction parallel with the optical axis of the substrate; and electrode means disposed on the surface of the substrate and positioned with respect to the waveguide to provide control of a coupling coefficient for conversion between one polarization mode and another, and control of the relative phase between the two modes;

whereby both modes experience the same material refractive index, and any phase mismatch between the modes can be corrected by applying a suitable bias voltage through the electrode means.

2. A mode converter as defined in claim 1, wherein the electrode means includes:

a first electrode positioned immediately over the waveguide;

a second electrode parallel to the waveguide and displaced laterally to one side; and a third and common electrode parallel to the waveguide and displaced laterally to the other side;

and wherein a first bias voltage is applied between the first and third electrodes to generate an electric field that is predominantly perpendicular to the surface of the substrate, and a second bias voltage is applied between the second and third electrodes to generate an electric field that is predominantly parallel to the surface of the substrate;

and wherein the first bias voltage is used to control the degree of coupling between the two polarization modes, and the second bias voltage is used to control the phase velocity mismatch between the two modes.

3. A converter as defined in claim 1, wherein the electrode means includes:

a first electrode parallel to the waveguide and displaced laterally from it;

a second electrode positioned over the waveguide in a partially overlapping relationship selected to provide within the waveguide an electric field that has selected vertical and horizontal components to control the degree of coupling between polarization modes, and the phase velocity mismatch between modes.

4. A wavelength-independent electrooptical polarization mode converter, comprising:

an electrooptical crystal substrate of lithium niobate, which has its optical axis in the z-axis direction, and is cut in a plane defined by a direction perpendicular to the optical or z axis;

an optical waveguide formed by diffusion of titanium into a surface of the substrate, the waveguide being oriented to provide for the propagation of light from one end of the waveguide to the other, in a direction parallel with the z axis of the substrate; and electrode means disposed on the surface of the substrate and positioned with respect to the waveguide to provide control of a coupling coefficient for conversion between a transverse-electric (TE) polarization mode a transverse-magnetic (TM) polarization mode, and control of phase mismatch between the two modes;

whereby both modes experience the same material refractive index, in the x and y directions orthogonal to the optical axis, and any phase mismatch between the modes can be corrected by applying a suitable bias voltage through the electrode means.

5. A mode converter as defined in claim 4, wherein the electrode means includes:

a first electrode positioned immediately over the waveguide;

a second electrode parallel to the waveguide and displaced laterally to one side; and a third and common electrode parallel to the waveguide and displaced laterally to the other side;

and wherein a first bias voltage is applied between the first and third electrodes to generate an electric field that is predominantly perpendicular to the surface of the substrate, and a second bias voltage is applied between the second and third electrodes to generate an electric field that is predominantly parallel to the surface of the substrate;

and wherein the first bias voltage is used to control the degree of coupling between the TE and TM polarization modes, and the second bias voltage is used to control the phase velocity mismatch between the two modes.

6. A converter as defined in claim 5, wherein:

the substrate is an x-cut, z-propagating crystal;

the first bias voltage generates an electric field predominantly in the x direction, to effect polarization mode conversion; and the second bias voltage generates an electric field predominantly in the y direction, to effect phase mismatch correction.

7. A converter as defined in claim 4, wherein the electrode means includes:

a first electrode parallel to the waveguide and displaced laterally from it;

a second electrode positioned over the waveguide in a partially overlapping relationship selected to provide within the waveguide an electric field that has selected vertical and horizontal components to control the degree of coupling between TE and TM polarization modes, and the phase mismatch between modes.

8. A wavelength-independent electrooptical polarization mode converter, comprising:
- an electrooptical crystal substrate of x-cut lithium niobate, which has its optical axis in the z-axis direction;
- an optical waveguide formed by diffusion of titanium into a surface of the substrate, the waveguide being oriented to provide for the propagation of light from one end of the waveguide to the other, in a direction parallel with the z axis of the substrate;
- a first electrode positioned immediately over the waveguide;
- a second electrode parallel to the waveguide and displaced laterally to one side; and
- a third and common electrode parallel to the waveguide and displaced laterally to the other side;
- and wherein a first bias voltage is applied between the first and third electrodes to generate an electric field that is predominantly in the x direction, and a second bias voltage is applied between the second and third electrodes to generate an electric field that is predominantly in the y direction;
- and wherein the first bias voltage is used to control the degree of coupling between transverse-electric (TE) and transverse-magnetic (TM) polarization modes, and the second bias voltage is used to control the phase velocity mismatch between the two modes;
- whereby both modes experience the same material refractive index, in the x and y directions orthogonal to the optical axis, and any phase mismatch between the modes can be corrected by applying a suitable bias voltage through the electrode means.

9. A converter as defined in claim 8, and further including:
- an input phase shifter to provide adjustment of the phase of an input optical signal; and
- an output phast shifter to provide adjustment of the phase of an optical output signal from the converter;
- whereby the combination of two phase shifters and the converter provide for conversion of any polarization angle and associated phase to any other polarization angle and phase.

10. A wavelength-independent electrooptical polarization angle modulator, comprising:
- an electrooptical crystal substrate of lithium niobate, which has it optical axis in the z-axis direction, and is cut in a plane defined by a direction perpendicular to the optical or z axis;
- an optical waveguide formed by diffusion of titanium into a surface of the substrate, the waveguide being oriented to provide for the propagation of light from one end of the waveguide to the other, in a direction parallel with the z axis of the substrate; and
- first electrode means disposed on the surface of the substrate and positioned with respect to the waveguide to provide control of a coupling coefficient for conversion between a transverse-electric (TE) polarization mod a transverse-magnetic (TM) polarization mode; and
- second electrode means, to control phase mismatch between the two modes;
- whereby both modes experience the same material refractive index, in the x and y directions orthogonal to the optical axis, and any phase mismatch between the modes can be corrected by applying a suitable bias voltage through the electrode means, after which control of the polarization mode coupling coefficient permits control of the polarization angle of light output from the device.

11. A wavelength-independent electrooptical polarization angle modulator, comprising:
- an electrooptical crystal substrate of x-cut lithium niobate, which has its optical axis in the z-axis direction;
- an optical waveguide formed by diffusion of titanium into a surface of the substrate, the waveguide being oriented to provide for the propagation of light from one end of the waveguide to the other, in a direction parallel with the z axis of the substrate;
- a first electrode positioned immediately over the waveguide;
- a second electrode parallel to the waveguide and displaced laterally to one side; and
- a third and common electrode parallel to the waveguide and displaced laterally to the other side;
- and wherein a first bias voltage is applied between the first and third electrodes to generate an electric field that is predominantly in the x direction, and a second bias voltage is applied between the second and third electrodes to generate an electric field that is predominantly in the y direction;
- and wherein the first bias voltage is used to control the degree of coupling between transverse-electric (TE) and transverse-magnetic (TM) polarization modes, and therefore to control the polarization angle if the phase velocity mismatch is eliminated, and the second bias voltage is used to control and eliminate the phase velocity mismatch between the two modes;
- whereby both modes experience the same material refractive index, in the x and y directions orthogonal to the optical axis, and any phase mismatch between the modes can be corrected by applying a suitable bias voltage through the electrode means.

12. An optical communication link employing polarization angle modulation, comprising:
- an optical source;
- a polarization angle modulator that is insensitive to wavelength, including means for correcting phase velocity mismatch between polarizaiton modes and means for independently varying the polarization mode coupling coefficient, and therefore varying the polarization angle of light output from the modulator;
- means for separating the modulated light into its polarization mode components;
- means for detecting the polarization mode components and producing corresponding electrical signal; and
- means combining the component signals in such a way as to produce and output signal that is proportional to the modulating signal but is independent of any variations in the intensity of the optical source.

13. An optical communication link as defined in claim 12, wherein the polarization angle modulator includes:
- an electrooptical crystal substrate of x-cut lithium niobate, which has its optical axis in the z-axis direction;
- an optical waveguide formed by diffusion of titanium into a surface of the substrate, the waveguide being oriented to provide for the propagation of light from one end of the waveguide to the other, in a direction parallel with the z axis of the substrate;

a first electrode positioned immediately over the waveguide;

a second electrode parallel to the waveguide and displaced laterally to one side; and a third and common electrode parallel to the waveguide and displaced laterally to the other side;

and wherein a first bias voltage is applied between the first and third electrodes to generate an electric field that is predominantly in the x direction, and a second bias voltage is applied between the second and third electrodes to generate an electric field that is predominantly in the y direction;

and wherein the first bias voltage is used to control the degree of coupling between transverse-electric (TE) and transverse-magnetic (TM) polarization modes, and therefore to control the polarization angle if the phase velocity mismatch is eliminated, and the second bias voltage is used to control and eliminate the phase velocity mismatch between the two modes;

whereby both modes experience the same material refractive index, in the x and y directions orthogonal to the optical axis, and any phase mismatch between the modes can be corrected by applying a suitable bias voltage through the electrode means.

14. An optical communication link as defined in claim 13, wherein:

the means for separating the modulated light into its polarization components includes polarization beam splitter;

the means combining the component signals includes means for generating a difference signal from the two component signals, means for generating a sum signal from the two compnonent signals, and means for dividing the difference signal by the sum signal to obtain a signal proportional to the original modulating signal and independent of the intensity of the optical source.

* * * * *